United States Patent
Fan et al.

(10) Patent No.: US 11,265,621 B2
(45) Date of Patent: Mar. 1, 2022

(54) VIDEO PUSH METHOD, DEVICE AND COMPUTER-READABLE STORAGE MEDIUM

(71) Applicant: SHENZHEN SKYWORTH-RGB ELECTRONIC CO., LTD., Shenzhen (CN)

(72) Inventors: Siyue Fan, Shenzhen (CN); Xiao Wang, Shenzhen (CN)

(73) Assignee: SHENZHEN SKYWORTH-RGB ELECTRONIC CO., LTD., Shenzhen (CN)

(*) Notice: Subject to any disclaimer, the term of this patent is extended or adjusted under 35 U.S.C. 154(b) by 0 days.

(21) Appl. No.: 16/999,326

(22) Filed: Aug. 21, 2020

(65) Prior Publication Data

US 2020/0382848 A1  Dec. 3, 2020

Related U.S. Application Data

(63) Continuation of application No. PCT/CN2018/119746, filed on Dec. 7, 2018.

(30) Foreign Application Priority Data

Mar. 27, 2018  (CN) .......................... 201810261330.4

(51) Int. Cl.
*H04N 21/8405* (2011.01)
*H04N 21/2665* (2011.01)
(Continued)

(52) U.S. Cl.
CPC ..... *H04N 21/8405* (2013.01); *H04N 21/2665* (2013.01); *H04N 21/4826* (2013.01)

(58) Field of Classification Search
CPC ........... H04N 21/8405; H04N 21/2665; H04N 21/4826; H04N 21/232; H04N 21/2353;
(Continued)

(56) References Cited

U.S. PATENT DOCUMENTS 9,106,871 B2  8/2015  Rowe
2009/0037947 A1*  2/2009  Patil ..................... H04N 21/812
725/32
(Continued)

FOREIGN PATENT DOCUMENTS

CN   101047722 A   10/2007
CN   103051937 A    4/2013
(Continued)

OTHER PUBLICATIONS

International Search Report and Written Opinion in corresponding PCT Application No. PCT/CN2018/119746, dated Feb. 27, 2019.
(Continued)

*Primary Examiner* — Alexander Gee
(74) *Attorney, Agent, or Firm* — Westbridge IP LLC (57) ABSTRACT

The present application discloses a video push method, comprising: obtaining keyword information, and filtering electronic program information according to the keyword information to obtain a first push information; filtering network video information according to the keyword information to obtain a second push Information; generating a push list according to the first push information and the second push information, and pushing videos according to the push list. The application also discloses a video push device and a computer-readable storage medium. The present application completes the effective filtration of video data from two different sources being of television and network, and further completes the intelligent push of the video data, and can provide users with rich and high quality video resources firstly according to the retrieved keyword information.

4 Claims, 4 Drawing Sheets

(51) Int. Cl.
*H04N 21/482* (2011.01)
*H04N 21/433* (2011.01)
*H04N 21/442* (2011.01)
*H04N 21/462* (2011.01)
*H04N 21/466* (2011.01)
*H04N 21/435* (2011.01)
*H04N 21/262* (2011.01)
*H04N 21/61* (2011.01)

(58) Field of Classification Search
CPC ........... H04N 21/26258; H04N 21/278; H04N 21/4622; H04N 21/47202; H04N 21/4828
See application file for complete search history.

(56) References Cited

U.S. PATENT DOCUMENTS

| | | | | |
|---|---|---|---|---|
| 2009/0228774 | A1* | 9/2009 | Matheny | G06F 16/954 715/201 |
| 2012/0259950 | A1* | 10/2012 | Havekes | H04N 21/64738 709/217 |
| 2014/0033238 | A1* | 1/2014 | Jeon | H04N 21/4316 725/13 |
| 2014/0196090 | A1* | 7/2014 | Kataoka | H04N 21/84 725/43 |
| 2015/0033260 | A1* | 1/2015 | Ryu | H04N 21/4826 725/40 |
| 2015/0150054 | A1 | 5/2015 | Chang | |
| 2015/0178282 | A1* | 6/2015 | Gorur | G06F 16/9535 707/748 |
| 2015/0215670 | A1* | 7/2015 | Patel | H04N 21/4345 725/44 |
| 2016/0225023 | A1* | 8/2016 | Zhang | G06F 16/958 |
| 2016/0358025 | A1 | 12/2016 | Mei et al. | |
| 2017/0366587 | A1* | 12/2017 | Sharifi | H04N 21/4826 |

FOREIGN PATENT DOCUMENTS

| | | |
|---|---|---|
| CN | 103428525 A | 12/2013 |
| CN | 104219577 A | 12/2014 |
| CN | 106686462 A | 5/2017 |
| CN | 107094263 A | 8/2017 |
| CN | 107645667 A | 1/2018 |
| CN | 108491524 A | 9/2018 |
| WO | 0153966 A1 | 7/2001 |
| WO | 2011102886 A1 | 8/2011 |

OTHER PUBLICATIONS

First Office Action issued in counterpart Chinese Patent Application No. 201810261330.4, dated Mar. 18, 2021.
Extended European Search Report issued in counterpart European Patent Application 18912042.1, dated Sep. 8, 2021.
Second Office Action issued in counterpart Chinese Patent Application No. 201810261330.4, dated Nov. 1, 2021.

\* cited by examiner

VIDEO PUSH METHOD, DEVICE AND COMPUTER-READABLE STORAGE MEDIUM

The present application is a Continuation Application of International Application No. PCT/CN2018/119746, filed Dec. 7, 2018, which claims priority of the Chinese patent application filed on Mar. 27, 2018 in the Chinese Patent Office, with the application number 201810261330.4 and titled "Video Push Method, Device, and Computer-readable Storage Medium", the entire contents of which are hereby incorporated by reference.

FIELD

The present application relates to the technical field of television, and particularly relates to a video push method, device and computer-readable storage medium.

BACKGROUND

With the birth and development of the Internet, people's lifestyles and communication ways have undergone earth-shaking changes. The emergence and development of the Internet has broken the original media pattern. With the rapid development of information technology today, internet television as a leader on the Internet among various emerging media forms is booming in China.

However, due to the base of network video resources is too large, and the management and control of network video resources is not as strict as that of traditional television resources, the current network video resources are too complicated and of insufficient quality. The biggest impact on the user's viewing experience is lower definitions of network video resources. Due to the lack of rigorous review of videos on the network, there are a large number of low definition videos. However, contrary to the network television, for the traditional digital television, video definition can be guaranteed, but the richness of resources cannot be comparable with network resources.

The current video recommendation system cannot guarantee both the high definition of the recommended video resources and the rich video resources when recommending videos.

The above content is only used to help understand the technical solutions of the present application, and does not mean that the above content is recognized as prior art.

SUMMARY

The main purpose of the present application is to provide a video push method, device and computer-readable storage medium, aiming to solve the technical problem that the current video recommendation system cannot provide users with rich and high quality video resources simultaneously.

To achieve the above purpose, the present application provides a video push method, the video push method includes:

obtaining keyword information, and filtrating electronic program information according to the keyword information to obtain first push information;

filtrating network video information according to the keyword information to obtain second push information;

generating a push list according to the first push information and the second push information, and pushing videos according to the push list.

In one embodiment, the step of filtrating electronic program information according to the keyword information to obtain first push information includes:

obtaining event information table of electronic program information;

determining a table identifier of the event information table, and filtrating the electronic program information according to the table identifier and the keyword information to obtain first push information.

In one embodiment, the step of filtrating the electronic program information according to the table identifier and the keyword information includes:

determining a preset priority corresponding to the table identifier;

filtrating the electronic program information according to the preset priority and the keyword information.

In one embodiment, the step of filtrating network video information according to the keyword information to obtain second push information includes:

determining whether there exists match information matching the keyword information in the network video information;

in determination that there exists the match information, filtrating the match information to obtain the second push information.

In one embodiment, the step of filtrating the match information includes:

obtaining a match definition of the match information, and determining a preset definition;

filtrating the match information according to the match definition and the preset definition.

In one embodiment, the step of determining a preset definition includes:

detecting bandwidth information of current network;

determining the preset definition according to the bandwidth information.

In one embodiment, the step of generating a push list according to the first push information and the second push information includes:

obtaining video priorities of the first push information and the second push information;

generating a push list according to the first push information, the second push information, and the video priorities.

In an embodiment, the step of obtaining video priorities of the first push information and the second push information includes:

obtaining video numbers and history information of the first push information and the second push information;

determining video priorities of the first push information and the second push information according to the video number and the history information.

In addition, in order to achieve the above purpose, the present application also provides a video push device, the video push device includes: a memory, a processor, and a video push program stored on the memory and being executable on the processor, and when the video push program is executed by the processor, the steps of the video push method according to any one of the described above are implemented.

In addition, in order to achieve the above purpose, the present application also provides a computer-readable storage medium, a video push program is stored on the computer-readable storage medium, when the video push program is executed by the processor, the steps of the video push method according to any one of the described above are implemented.

The present application obtains the keyword information, and filtrates the electronic program information according to the keyword information to obtain first push information, and then generates a push list according to the first push Information and the second push information, and pushes videos according to the push list, thereby completing the effective filtration of video data from two different sources being of television and network, and further completing the intelligent push of the video data, and providing users with rich and high quality video resources firstly according to the retrieved keyword information.

The purpose implementation, functional characteristics and advantages of the present application will be further described in conjunction with embodiments and with reference to the drawings.

DETAILED DESCRIPTION OF THE EMBODIMENTS

It should be understood that the specific embodiments described herein are only used to explain the present application, and not used to limit the present application.

Figure 1:
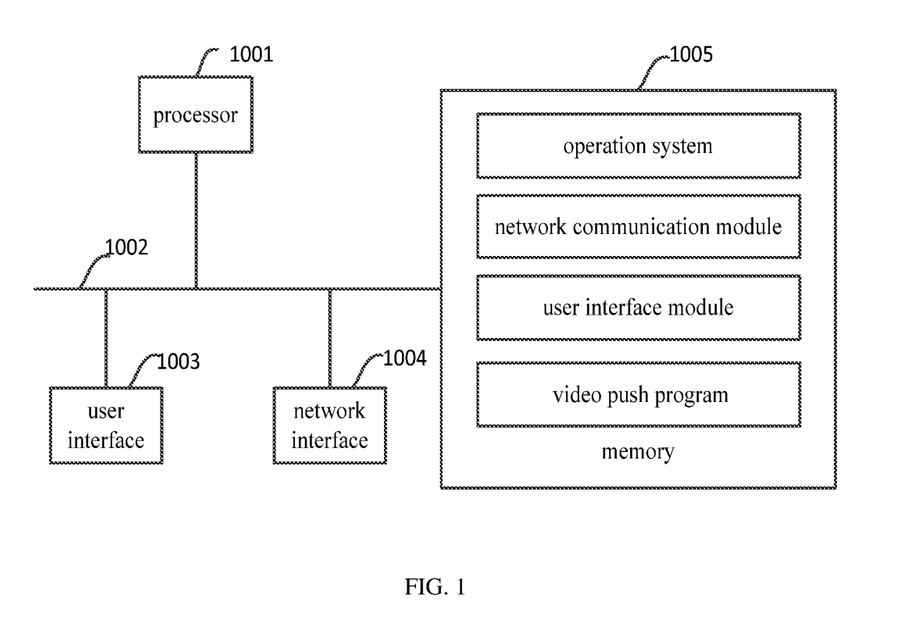
FIG. 1 is a schematic structural diagram of a terminal to which a video push device belongs in a hardware operation environment involved in an embodiment of the present application.

As shown in FIG. 1, FIG. 1 is a schematic structural diagram of a terminal to which a video push device belongs in a hardware operation environment involved in an embodiment of the present application.

In the embodiment of the present application, the terminal may be a PC, or a mobile terminal device with a display function such as a smart phone, a tablet computer, an e-book reader, an MP3 (Moving Picture Experts Group Audio Layer III) player, an MP4 (Moving Picture Experts Group Audio Layer IV) player, a portable computer, or the like.

As shown in FIG. 1, the terminal may include: a processor 1001, such as a CPU, a network interface 1004, a user interface 1003, a memory 1005, and a communication bus 1002. The communication bus 1002 is for implementing connection and communication among these components. The user interface 1003 may include a display screen (Display), an input unit such as a keyboard (Keyboard), and the user interface 1003 may optionally further include a standard wired interface and a wireless interface. The network interface 1004 may optionally include a standard wired interface and a wireless interface (such as a WI-FI interface). The memory 1005 may be a high-speed RAM memory, or a stable memory (non-volatile memory), such as a disk memory. The memory 1005 may optionally be a storage device independent of the foregoing processor 1001.

Optionally, the terminal may further include a camera, an RF (Radio Frequency) circuit, a sensor, an audio circuit, a WiFi module, and so on. The sensor can be such as a light sensor, a motion sensor or another sensor. Specifically, the light sensor may include an ambient light sensor and a proximity sensor, the ambient light sensor may adjust the brightness of the display screen according to the brightness of the ambient light, and the proximity sensor may turn off the display screen and/or backlight when the mobile terminal moves to the ear. The gravity acceleration sensor as a type of motion sensor can detect magnitudes of acceleration in various directions (generally three axes), and can detect the strength and direction of gravity when at rest, and can be used for applications that recognize the postures of mobile terminals (such as horizontal and vertical screen switching, related games, magnetometer posture calibration), vibration recognition related functions (such as pedometer, tap), etc. Of course, the mobile terminal can also be configured with gyroscope, barometer, hygrometer, thermometer, infrared sensor and other sensors, which will not be repeated here.

Those skilled in the art may understand that the structure of the terminal shown in FIG. 1 does not limit the terminal, and the terminal may include more or fewer components than those shown in the figure, or combine certain components, or have different arrangements of components.

As shown in FIG. 1, the memory 1005 as a computer storage medium may include an operation system, a network communication module, a user interface module, and a video push program.

In the terminal shown in FIG. 1, the network interface 1004 is mainly used to connect to a background server and perform data communication with the background server. The user interface 1003 is mainly used to connect to a client (user terminal) and perform data communication with the client, and the processor 1001 can be used to call the video push program stored in the memory 1005.

When the processor 1001 calls the video push program stored in the memory 1005, the following operations are implemented:

obtaining keyword information, and filtering electronic program information according to the keyword information to obtain first push information;

filtering network video information according to the keyword information to obtain second push information;

generating a push list according to the first push information and the second push information, pushing videos according to the push list.

Further, when the video push program is executed by the processor, the following operations are also implemented:

obtaining event information table of electronic program information;

determining a table identifier of the event information table, and filtrating the electronic program information according to the table identifier and the keyword information to obtain the first push information.

Further, when the video push program is executed by the processor, the following operations are also implemented:

determining a preset priority corresponding to the table identifier;

filtrating the electronic program information according to the preset priority and the keyword information.

Further, when the video push program is executed by the processor, the following operations are also implemented:

determining whether there exists match information matching the keyword information in the network video information;

in determination that there exists the match information, filtering the match information to obtain the second push information.

Further, when the video push program is executed by the processor, the following operations are further implemented:

obtaining a match definition of the match information, and determining the preset definition;

filtering the match information according to the match definition and the preset definition.

Further, when the video push program is executed by the processor, the following operations are also implemented:

detecting bandwidth information of current network;

determining the preset definition according to the bandwidth information.

Further, when the video push program is executed by the processor, the following operations are also implemented:

obtaining video priorities of the first push information and the second push information;

generating the push list according to the first push information, the second push information, and the video priorities.

Further, when the video push program is executed by the processor, the following operations are also implemented:

obtaining video numbers and history information of the first push information and the second push information;

determining the video priorities of the first push information and the second push information according to the video numbers and the history information.

Figure 2:
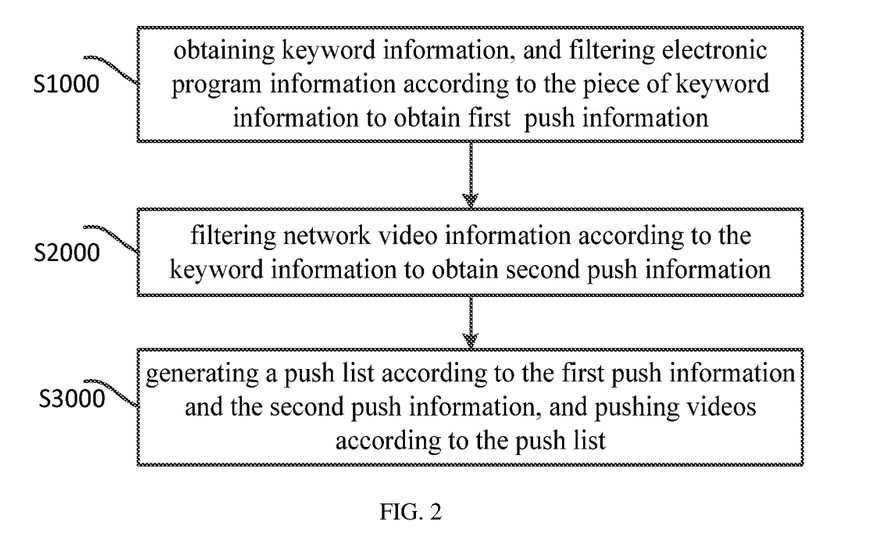
FIG. 2 is a schematic flowchart of a first embodiment of a video push method of the present application.

The present application provides a video push method. Referring to FIG. 2, FIG. 2 is a schematic flowchart of a first embodiment of the video push method of the present application.

In this embodiment, the video push method includes:

Step S1000: obtaining keyword information, and filtering electronic program information according to the keyword information to obtain first push information.

In this embodiment, pieces of keyword information are pre-stored, and different pieces of keyword information can be pre-stored by sub-classifying the videos. Specifically, in the current network video system and electronic program system, each video has its corresponding tag information. The tag information can be obtained and stored as the keyword information. Simultaneously, the keyword information can also be determined by customizing the categories of videos. For example, videos can be divided into different types such as gym, dramas, movies, variety shows, and anime. Gym can be divided into English Premier League, Wimbledon and the German Bundesliga etc. The dramas can be divided into costume dramas, romance dramas and family dramas, etc. Names of the different sub-classified video types are the keyword information.

The keyword information is obtained, and corresponding video resources are obtained by searching with the keyword information. There are two sources of television videos, one is obtained through electronic program information, and the other is obtained through network video information. Specifically, when the keyword information is obtained, the electronic program information can be filtrated according to the keyword information, where the electronic program information is program information of television channels. When the electronic program information is filtrated according to the keyword information, specifically when event information tables of the electronic program information are obtained, and table identifiers of the event information tables are determined, the electronic program information is filtrated according to the table identifiers and the keyword information, so as to obtain the corresponding first push information.

Specifically, the electronic program information includes network information, program group information, service description information, and event information expressed in text format. The electronic program information totally includes nine different types of tables. A table of information on events is the event information table. An event is a segment in a program, and includes a start time, a duration, an event name, and a brief description. The information in the table is propagated by data segments, and the table to which the data segments belong can be identified by the table identifier, so that the event information corresponding to the table identifier can be obtained according to the table identifier. Values of different table identifiers correspond to different preset priorities, by which an order of pieces of event information corresponding to the table identifiers of different values can be determined. When the preset priorities of the table identifiers of the event information table are determined, pieces of event information corresponding to the table identifiers are obtained in an order of their preset priorities of the table identifiers from the highest to the lowest. The obtained pieces of event information are matching with the piece of keyword information in an order of the preset priorities from high to low until the number of the obtained pieces of event information matching the piece of keyword information reaches a preset threshold, and then the first push information is generated according to the currently obtained pieces of event information matching the piece of keyword information in an order of the preset priorities from high to low.

Step S2000: filtering network video information according to the keyword information to obtain second push information.

In this embodiment, when the network video information can be filtrated according to the keyword information, the network video information is the network video resources obtained by a network terminal. The network video resources can be obtained through an API (Application Programming Interface) corresponding to a website. When the network video information is filtrated according to the keyword information, a current match degree between the keyword information and the network video information is obtained. The match degree specifically relates to a match degree between the keyword information and a name or title of the network video information. If the match degree between the keyword information and the network video information is not less than a preset match degree, it is determined that there exists match information matching the keyword information in the network video information. If the match degree between the keyword information and the network video information is less than the preset match degree, it is determined that there exists no match information matching the keyword information in the network video information.

When it is determined that there exists the match information, the match information is further filtrated. Specifically, a match definition of the match information and a preset definition are obtained. If the match definition of the match information is greater than the preset definition, only the match information corresponding to the current match definition is obtained. At this time, the match information is the second push information. The preset definition is a definition threshold determined according to current user's bandwidth information. Specifically, when the preset definition is a first definition, only the match information with a match definition not less than the first definition is obtained, and taken as the second push information. When the preset definition is a second definition, the match information with a match definition not less than the second definition is obtained, and taken as the second definition. The first definition and the second definition are definitions corresponding to different preset bandwidth information respectively, and the second definition is greater than the first definition. Particularly, when it is detected that the current user's bandwidth information is the minimum bandwidth threshold. At this time, due to the limitation of the network environment, the actual network download speed is relatively small, in which case the user can actually only watch videos with lower definition. Therefore, there defines no preset definition corresponding to the minimum bandwidth threshold.

Step S3000: generating a push list according to the first push information and the second push information, and pushing videos according to the push list.

In this embodiment, when the first push information and the second push information are obtained, the first push information and the second push information are further sorted together, so that a corresponding push list can be obtained. Specifically, the push list is formed after sorting the first push information and the second push information. When the first push information and the second push information are obtained, push priorities of the first push information and the second push information are obtained. For the same keyword information, if both the first push information and second push information are obtained, the push priority of the first push information is greater than that of the second push information in the push list; if the first push information cannot be obtained, and only the second push information can be obtained, at this time, the push list is constituted by the second push information; if the second push information cannot be obtained, and only the first push information can be obtained, at this time, the push list is constituted by the first push information.

After push priorities of the first push information and the second push information are determined, video priorities of different videos in the first push information and the second push information are further determined. Video priorities are priorities of the videos in the first push information and the second push information. Specifically, video numbers in the first push information and the second push information are obtained to determine whether the video numbers exist in a history database. It can be determined whether the videos (push information) corresponding to the video numbers have corresponding history information in the history database according to the video numbers, so that video priorities of the first push information and the second push information can be further determined according to the history information to generate a final push list according to the video priorities.

If it is determined that a video number doesn't exist in the history database, it is determined that there exists no history information for the push information corresponding to the video number. At this time, it is determined whether the push information corresponding to the video number is unrecorded information, if the push information is unrecorded information, it means that the push information has not been recorded in previous push lists, and then the push information corresponding to the video number is determined to be of a first push level. If the push information is the recorded information, it means that the push information has been in the push list before but not been clicked by the user, and then a push level of the push information is decreased by one level at a time. If it is determined that the video number exists in the history database, it is determined that there exists history information for the push information corresponding to the video number. At this time, a number of views corresponding to the video number is obtained, if the number of views corresponding to the video number is greater than the maximum view threshold, the push information corresponding to the video number is determined to be of a second push level. If the number of views corresponding to the video number is greater than one but less than the maximum view threshold, the push information corresponding to the video number is determined to be of a third push level. The first push level is greater than the second push level and the second push level is greater than the third push level in the push list.

The video push method proposed in this embodiment implements the effective filtration of videos from two different sources: television and network, and further implements the intelligent push of the videos, and can provide users with rich and high quality video resources firstly according to the retrieved keyword information, by obtaining keyword information, filtrating electronic program information according to the keyword information to obtain first push information, filtrating network video information according to the keyword information to obtain second push information, generating a push list according to the first push information and the second push information, and pushing videos according to the push list.

Figure 3:
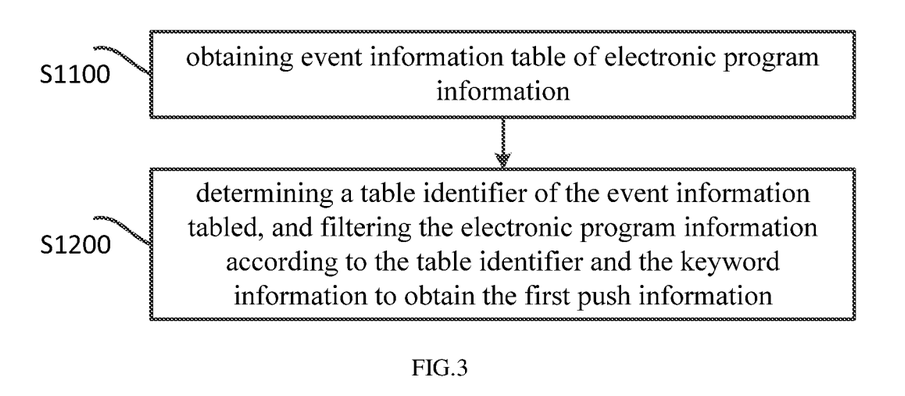
FIG. 3 is a schematic flowchart of a second embodiment of the video push method of the present application.

Based on the first embodiment, a second embodiment of the video push method of the present application is proposed. Referring to FIG. 3, in this embodiment, Step S1000 includes:

Step S1100: obtaining event information table of electronic program information;

Step S1200: determining a table identifier of the event information tabled, and filtering the electronic program information according to the table identifier and the keyword information to obtain the first push information.

Electronic program information includes network information, program group information, service description information and event information in text format. The electronic program information totally includes nine different types of tables. A table composed of the event information is the event information table. An event is a time segment in a program, which includes a start time, a duration, an event name and a brief description of the event. A program can be expressed as a collection of multiple consecutive events. For example, a news simulcast from 19:00 to 19:30 in the evening is an event. The event starts at 19:00 in the evening and lasts for 30 minutes. The program name is news simulcast. The information in the table is propagated by the data segments, and the table to which the data segment belongs can be identified by the table identifier, so that the event information corresponding to the table identifier can be obtained by the table identifier. Values of different table identifiers have correspondingly different preset priorities, by which the order of obtaining event information corresponding to the table identifiers of different values can be determined.

For example, values corresponding to the table identifier table_id are 0x4e, 0x4f, 0x50-0x5f, etc. The table identifier table_id=0x4e indicates the actual/following event information of the current channel, and the table identifier table_id=0x4f indicates the actual/following event information of other channels. The identifier table_id=0x50-0x5f indicates a program schedule of the current channel. If a preset priority of the table identifier table_id=0x4e is the first priority, then the preset priority of the table identifier table_id=0x4e is higher than a preset priority of the table identifier table_id=0x4f which is the second priority. The preset priority of the table identifier table_id=0x4f is higher than a preset priority of the table identifier table_id=0x50-0x5f which is the third priority, and so on. Further, when the table identifier table_id=0x4e and the table identifier table_id=0x4f, the event information of the current channel and other channels is distinguished according to section_number as actual (i.e., current) event information or following event information. When the section_number=0x00, it means the event information is the actual event information. When the section_number=0x01, it means the event information is the following event information, a preset priority of section_number=0x00 is higher than that of section_number=0x01., a preset priority corresponding to the table identifier table_id=0x4e and section_number=0x00 is the highest priority.

In determining a preset priority of a table identifier of the event information table, the event information corresponding to the table identifier is obtained in an order of their preset priorities from high to low. The obtained event information is matching with the keyword information in an order of their preset priorities from high to low until an amount of the obtained event information matching the keyword information reaches a preset threshold, and then the first push information is generated according to the currently obtained event information matching the keyword information in an order of their preset priorities of the event information from high to low.

The video push method proposed in this embodiment implements the filtration of electronic program information by obtaining event information table of electronic program information, and then determining a table identifier of the event information table and filtrating the electronic program information according to the table identifier and the keyword information to obtain the first push information, and improves a filtration efficiency through the table identifier and the keyword information, and further ensures that the obtained first push information is what required by the user.

Figure 4:
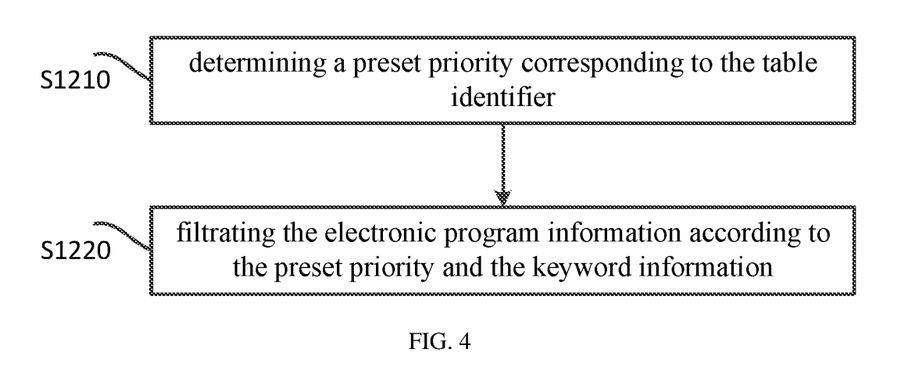
FIG. 4 is a schematic flowchart of a third embodiment of the video push method of the present application.

Based on the second embodiment, the third embodiment of the video push method of the present application is proposed. Referring to FIG. 4, in this embodiment, Step S1200 includes:

Step S1210: determining a preset priority corresponding to the table identifier;

Step S1220: filtrating the electronic program information according to the preset priority and the keyword information.

In this embodiment, there are 16 table identifiers allocated in the event information table, corresponding event information can be obtained according to the table identifiers, and table identifiers with different values have different preset priorities. A preset priority is a priority preset for obtaining event information corresponding to a table identifier. When a preset priority of a table identifier is of the highest level, event information corresponding to the table identifier is firstly obtained. When a preset priority of a table identifier is of the lowest level, event information corresponding to the table identifier is lastly obtained.

When the preset priorities are obtained, the event information corresponding to the table identifiers are obtained in an order of their preset priorities from the highest to the lowest, and the event information is matching with the keyword information. When a match degree between the event information and the keyword information is greater than the preset match degree, the match is successful. the first push information is specifically constituted by the event information matched successfully. When the match degree between the event information and the keyword information is less than the preset match degree, The match is failure. For example, if the preset priority corresponding to the table identifier table_id=0x4e and section_number=0x00 is the highest priority, the event information corresponding to the table_id=0x4e and section_number=0x00 will be obtained firstly, and the event information is matching with the keyword information. When a match degree between the event information and the keyword information is greater than the preset match degree, the match is successful, and the event information is added to the first push information and has the highest priority. For other table identifiers corresponding to the preset priorities less than the highest priority, the corresponding pieces of event information are sequentially obtained in an order of their preset priorities from high to low, and the event information is matching with the keyword information. For those pieces of event information matched successfully, they are added to the first push information in an order of the corresponding priorities from high to low until the amount of obtained event information which matched the keyword information reaches a preset threshold.

The video push method proposed in this embodiment determines the preset priorities corresponding to the table identifiers, and filtrates the electronic program information according to the table identifiers and the keyword information, thereby completing the filtration of electronic program information according to the preset priorities, improving the filtration efficiency, and ensuring that the filtrated first push information is what required by the user.

Figure 5:
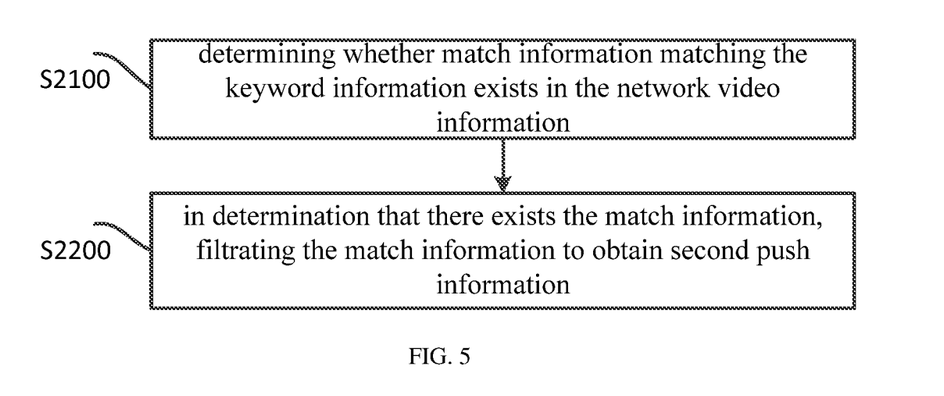
FIG. 5 is a schematic flowchart of a fourth embodiment of the video push method of the present application.

Based on the first embodiment, a fourth embodiment of the video push method of the present application is proposed. Referring to FIG. 5, in this embodiment, Step S2000 includes:

Step S2100: determining whether match information matching the keyword information exists in the network video information;

Step S2200: in determination that there exists the match information, filtrating the match information to obtain second push information.

In this embodiment, the network video information is the network video resource obtained in the network and the network video resource can be obtained by an API (Application Programming Interface) corresponding to a website. Specifically, when the keyword information is obtained, the match information matching the keyword information can be obtained from the network video information of the website through the keyword information and the API interface corresponding to website. When a match degree of the keyword information and the network video information is not less than the preset match degree, it is determined that the match information matching the keyword information exists in the network video information. When the match degree of the keyword information and the network video information is less than the preset match degree, it is determined that no match information matching the keyword information exists in the network video information.

When it is determined that the match information exists, the match information is further filtrated. Specifically, the match information can be filtrated according to a preset definition which corresponds to the current user's bandwidth. When to obtain the preset definition, the current user's bandwidth is detected, and the preset definition can be determined according to the current bandwidth. The matching definition corresponding to the match information can be obtained by obtaining the video definition of the match information. After the match definition of the match information is obtained and the currently corresponding preset definition is determined, the match definition and the preset definition are compared, when it is determined that the current match definition is greater than the preset definition, only the match information corresponding to the current match definition is obtained. At this time, the match information is the second push information.

The video push method proposed in this embodiment determines whether there exists the match information matching the keyword information in the network video information, and then filtrates the match information to obtain second push information when determines that there exists the match information, thereby completing intelligent filtration of the network video information, which makes the obtained network video information more in line with user's needs, and provides users with a more complete video recommendation service.

Figure 6:
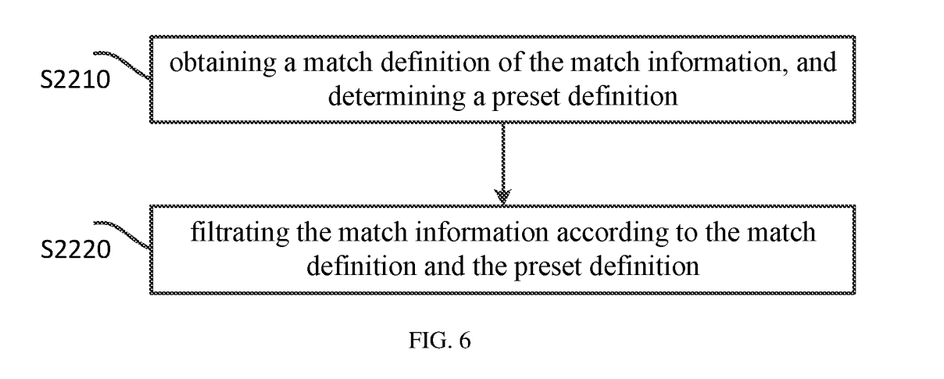
FIG. 6 is a schematic flowchart of a fifth embodiment of the video push method of the present application.

Based on the fourth embodiment, a fifth embodiment of the video push method of the present application is proposed. Referring to FIG. 6, in this embodiment, Step S2200 includes:

Step S2210: obtaining a match definition of the match information is obtained, and a preset definition is determined;

Step S2220: filtrating the match information according to the match definition and the preset definition.

In this embodiment, the preset definition is a definition threshold determined according to the current user's bandwidth information, and different bandwidth information may correspond to different definition thresholds (i.e., preset definitions). The match definition is a definition corresponding to the obtained match information matching the keyword information. When it is determined that the match information matching the keyword information exists in the network video information, the current user's bandwidth information is detected, and the currently corresponding preset definition is determined according to the bandwidth information. After the preset definition is obtained, the preset definition and the matching definition are compared to each other, and the match information is filtrated according to the comparison result, so as to determine the second push information corresponding to the network video information.

Specifically, after the preset definition corresponding to the current user's bandwidth information is determined, and the match definition corresponding to the match information is obtained, the match definition and the preset definition are compared. When the preset definition is the first definition, only the match information with a match definition not less than the first definition is obtained. When the preset definition is the second definition, the match information with a match definition not less than the second definition is obtained. The second definition is greater than the first definition. Particularly, when it is detected that the current user's bandwidth information is the minimum bandwidth threshold. At this time, due to the limitation of the network environment, the actual network download speed is relatively small, in which case the user can actually only watch videos with a lower definition. Therefore, there defines no preset definition corresponding to the minimum bandwidth threshold.

For example, when the minimum bandwidth threshold is 4M, although a theoretical download speed is 512 k/s under the 4M bandwidth, however due to the limitation of the complicated network environment, the download speed is generally only 300 k to 400 k. In fact, only videos below 720p can be viewed under such a bandwidth, so if the user's bandwidth is below 4M, there is no limitation on the video definition. While under an 8M bandwidth, it can basically support a fluent play of the 720p resources in the current mainstream video websites. Therefore, When the user's bandwidth information is detected to be 8M, it is determined that the preset definition corresponding to the current bandwidth information is the first definition. At this time, the first definition is 480p, and the match information with a match definition greater than the first definition 480p is added to the second push information. For the user's bandwidth greater than 8M, due to the large number of current resources in the video websites have a definition of only 720p, so if the threshold is increased again, the richness of the user's viewing resources will be reduced. Therefore, When the bandwidth is greater than 8M, the corresponding preset definition is the second definition. At this time, the second definition is 720p, and the match information with a match definition greater than the second definition 720p is added to the second push information.

The video push method proposed in this embodiment obtains the match definition of the match information and determines the preset definition, and then filtrates the match information according to the match definition and the preset definition, thereby completing a further filtration of the match information matching the keyword information according to the definition, improving the accuracy of obtaining the effective video information, and further improving the diversity of users' viewing video resources.

Figure 7:
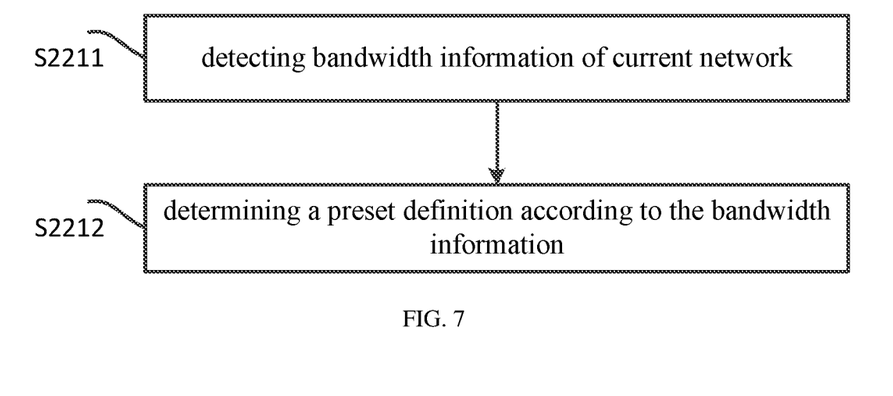
FIG. 7 is a schematic flowchart of a sixth embodiment of the video push method of the present application.

Based on the fifth embodiment, a sixth embodiment of the video push method of the present application is proposed. Referring to FIG. 7, in this embodiment, Step S2210 includes:

Step S2211, detecting bandwidth information of current network;

Step S2212: determining a preset definition according to the bandwidth information.

In this embodiment, the preset definition is a definition threshold determined according to the current user's bandwidth information, and the current user's network download speed can be determined according to the bandwidth information. Different bandwidth information may correspond to different definition thresholds (i.e., preset definitions). Therefore, when the match information matching the keyword information is obtained, the current user's bandwidth information is detected, and the preset definition can be determined according to the bandwidth information. Specifically, when the match information is obtained, the current user's bandwidth information is detected. If the current user's bandwidth information is the minimum bandwidth threshold, there is no limitation on the preset definition corresponding to the minimum bandwidth threshold. If the current user's bandwidth information is between the minimum bandwidth threshold and the first bandwidth threshold greater than the minimum bandwidth threshold, the corresponding first definition is obtained as the current preset definition. If the current user's bandwidth information is greater than the second bandwidth threshold which is greater than the first bandwidth threshold, the corresponding second definition is obtained as the current preset definition.

The video push method proposed in this embodiment detects the bandwidth information of the current network, and then determines the preset definition of the current video according to the bandwidth information, thereby completing the determination of the preset definition according to the bandwidth information, and further completing the filtration of network video information, and improving the diversity of the user's viewing video resource.

Figure 8:
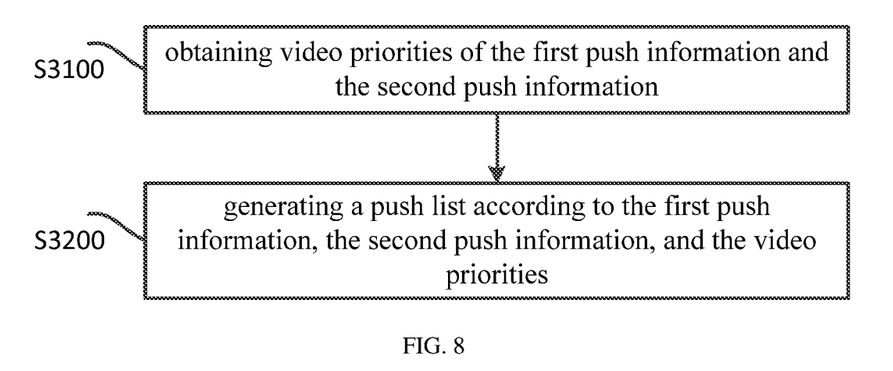
FIG. 8 is a schematic flowchart of a seventh embodiment of the video push method of the present application.

Based on the first embodiment, a seventh embodiment of the video push method of the present application is proposed. Referring to FIG. 8, in this embodiment, Step S3000 includes:

Step S3100: obtaining video priorities of the first push information and the second push information;

Step S3200: generating a push list according to the first push information, the second push information, and the video priorities.

In this embodiment, when the first push information and the second push information are obtained, the first push information and the second push information are further sorted together, so that a push list can be generated. Specifically, the first push information is obtained by filtrating the electronic program information, and the second push information is obtained by filtrating the network video information. When the first push information and the second push information are obtained, push priorities of the first push information and the second push information are also obtained. If there exists both the first push information and the second push information obtained according to the same keyword information, a push priority of the first push information is higher than that of the second push information in the push list. For the same keyword information, If the first push information cannot be obtained, and only the second push information can be obtained, at this time, the push list is constituted by the second push information; if the second push information cannot be obtained, and only the first push information can be obtained, at this time, the push list is constituted by the first push information.

After the push priorities of the first push information and the second push information are determined, video priorities of different videos in the first push information and the second push information are further determined. Specifically, video numbers of the first push information and the second push information are obtained to determine whether the video numbers exist in the history database. It can be determined whether the videos (push information) corresponding to the video numbers have corresponding history information in the history database according to the video numbers, so that video priorities of the first push information and the second push information can be further determined according to the history information, so that a final push list is generated according to the video priority.

The video push method proposed in this embodiment obtains the video priorities of the first push information and the second information, and then generates the push list according to the first push information, the second push information and the video priorities, thereby completing the generation of the push list according to the first push information and the second push information, so that the generated push list can both ensure the rich resources and satisfy the requirements of high quality resources.

Figure 9:
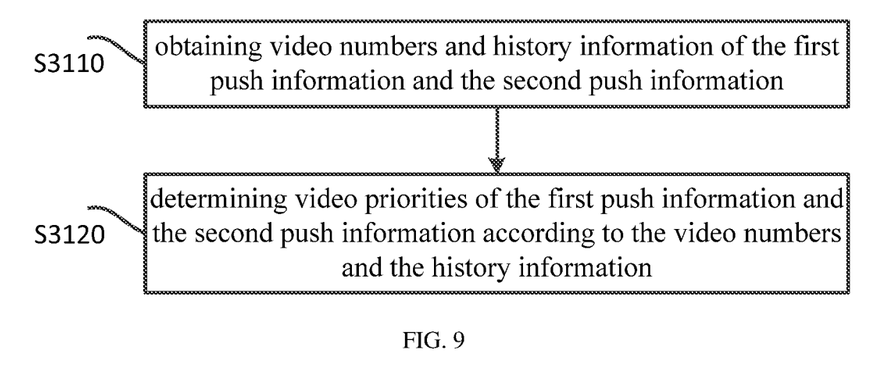
FIG. 9 is a schematic flowchart of an eighth embodiment of the video push method of the present application.

Based on the seventh embodiment, an eighth embodiment of the video push method of the present application is proposed. Referring to FIG. 9, in this embodiment, Step S3100 includes:

Step S3110: obtaining video numbers and history information of the first push information and the second push information;

Step S3120: determining video priorities of the first push information and the second push information according to the video numbers and the history information.

In this embodiment, Videos that the user has viewed are stored in the history database, and when the first push information and the second push information are obtained, it is determined that whether the first push information and the second push information have corresponding history information in the history database. The video numbers and times of views that the user has viewed are stored in the history database, that is, the history information includes the video numbers and the times of views. When the first push information and the second push information are obtained, and push priorities of the first push information and the second push information are determined, video priorities of different videos in the first push information and the second push information are further determined. Specifically, the video numbers in the first push information and the second push information are obtained to determine whether the video numbers exist in the history database. If it is determined that the video numbers doesn't exist in the history database, it is determined that there exists no history information for the push information corresponding to the video numbers, which means that the push information corresponding to the video numbers has never been viewed by the user. At this time, it is judged whether the push information corresponding to the video number is a pieces of unrecorded information, if the push information is a piece of unrecorded information, it means that the push information has not been recorded in the push list before, and then the push information corresponding to the video numbers is of the first push level. If the push information is a piece of recorded information, it means that the push information has been existed in the push list before but has not been clicked by the user, then the push level of the push information is decreased by one level at a time.

If it is determined that there exist the video numbers in the history database, it is determined that there exists history information for the push information corresponding to the video numbers. The times of views corresponding to the video numbers are obtained, if the times of views corresponding to the video numbers are greater than a maximum view threshold, the push information corresponding to the video numbers is of the second push level. If the times of views corresponding to the video numbers is greater than one but less than the maximum view threshold, the push information corresponding to the video numbers is of the third push level. Among them, the first push level is higher than the second push level, and the second push level is higher than the third push level in the push list.

The video push method proposed in this embodiment obtains the video numbers and history information of the first push information and the second push information, and then determines the video priorities of the first push information and the second push information according to the video numbers and the history information, thereby completing the determination of priority levels of the first push information and the second information, so that the user can obtain the required program information preferentially according to the priorities.

In addition, in order to achieve the above purpose, the present application also provides a computer-readable storage medium on which a video push program is stored. When the video push program is executed by a processor, the following steps are implemented:

obtaining keyword information, and filtrating electronic program information according to the keyword information to obtain first push information;

filtrating network video information according to the keyword information to obtain second push information;

generating a push list according to the first push information and the second push information, and pushing videos according to the push list.

Further, when the video push program is executed by the processor, the following operations are also implemented:

obtaining event information table of electronic program information;

determining a table identifier of the event information table, and filtrating the electronic program information according to the table identifier and the keyword information to obtain first push information.

Further, when the video push program is executed by the processor, the following operations are also implemented:

determining a preset priority corresponding to the table identifier;

filtrating the electronic program information according to the preset priority and the keyword information.

Further, when the video push program is executed by the processor, the following operations are also implemented:

determining whether there exists match information matching the keyword information in the network video information;

in determination that there exists the match information, filtrating the match information to obtain the second push information.

Further, when the video push program is executed by the processor, the following operations are also implemented:

obtaining a match definition of the match information, and determining the preset definition;

filtrating the match information according to the match definition and the preset definition.

Further, when the video push program is executed by the processor, the following operations are also implemented:

detecting bandwidth information of current network;

determining the preset definition according to the bandwidth information.

Further, when the video push program is executed by the processor, the following operations are also implemented:

obtaining video priorities of the first push information and the second push information;

generating a push list according to the first push information, the second push information, and the video priorities.

Further, when the video push program is executed by the processor, the following operations are also implemented:

obtaining video numbers and history information of the first push information and the second push information;

determining the video priorities of the first push information and the second push information according to the video numbers and the history information.

It should be noted that the terms herein "include", "comprise" or any other variant thereof are intended to cover non-exclusive inclusion, so that a process, method, article or system that includes a series of elements includes not only those elements, but also includes other elements that are not explicitly listed, or includes elements inherent to this process, method, article, or system. Without more limitation, the element defined by the sentence "include one . . . " does not exclude that there are other identical elements included in the process, method, article or system that includes the element.

The sequence numbers of the above embodiments of the present application are only for description, and do not represent the advantages and disadvantages of the embodiments.

Through the description of the above embodiments, those skilled in the art can clearly understand that the methods in the above embodiments can be implemented by means of software plus the necessary general hardware platform, and of course, can also be implemented by hardware, but in many cases the former is better Implementation. Based on such understanding, the technical solution of the present application in essence or part that contributes to the prior art can be embodied in the form of a software product, and the computer software product is stored in a storage medium (such as ROM/RAM, Disk, CD) as described above, including several instructions to make a terminal device (may be a mobile phone, computer, server, air conditioner, or network equipment, etc.) to perform the methods described in various embodiments of the present application.

The above are only preferred embodiments of the present application, and do not limit the scope of the patent of the present application. Any equivalent structures or equivalent process transformation made by the description and drawings of the present application, or directly or indirectly applied on other related technical fields are all included in the patent protection scope of the present application.

What is claimed is:

1. A video push method, comprising:

obtaining keyword information, and filtrating electronic program information according to the keyword information to obtain first push information, wherein the keyword information is tag information pre-stored corresponding to each video in a current network video system and in an electronic program system; or the keyword information is a name of a sub-classified video type of videos;

filtrating network video information according to the keyword information to obtain second push information; and generating a push list according to the first push information and the second push information, and pushing videos according to the push list, wherein the step of filtrating network video information according to the keyword information to obtain second push information comprises:

determining whether there exists match information matching the keyword information in the network video information; and in determination that there exists the match information, filtrating the match information to obtain the second push information, wherein the step of filtrating the match information comprises:

obtaining a match definition of the match information;

detecting bandwidth information of a current network, and determining a preset definition according to the bandwidth information; and filtrating the match information according to the match definition and the preset definition, wherein the step of detecting bandwidth information of a current network, and determining a preset definition according to the bandwidth information comprises:

detecting the bandwidth information of the current network when the match information is obtained;

if the bandwidth information of the current network is at a minimum bandwidth threshold, there is no limitation on the preset definition corresponding to the minimum bandwidth threshold;

if the bandwidth information of the current network is between the minimum bandwidth threshold and a first bandwidth threshold, obtaining a corresponding first definition and taking the first definition as the preset definition, the first bandwidth threshold is greater than the minimum bandwidth threshold; and if the bandwidth information of the current network is greater than a second bandwidth threshold, obtaining a corresponding second definition and taking the second definition as the preset definition, the second bandwidth threshold is greater than the first bandwidth threshold.

2. A video push method, comprising:

obtaining keyword information, and filtrating electronic program information according to the keyword information to obtain first push information, wherein the keyword information is tag information pre-stored corresponding to each video in a current network video system and in an electronic program system; or the keyword information is a name of a sub-classified video type of videos;

filtrating network video information according to the keyword information to obtain second push information; and generating a push list according to the first push information and the second push information, and pushing videos according to the push list, wherein the step of generating a push list according to the first push information and the second push information comprises:

obtaining video numbers and history information of the first push information and the second push information;

determining video priorities of the first push information and the second push information according to the video numbers and the history information; and generating a push list according to the first push information, the second push information, and the video priorities, wherein the step of determining video priorities of the first push information and the second push information according to the video numbers and the history information comprises:

determining whether the video numbers exist in a history database, thereby determining whether push information corresponding to the video numbers has corresponding history information in the history database;

in determining that a video number doesn't exist in the history database, determining that push information corresponding to the video number has no history information in the history database, and determining the push information corresponding to the video number to be a first push information;

in determining that a video number exists in the history database, obtaining a number of views corresponding to the video number, and if the number of views corresponding to the video number is greater than a maximum view threshold, determining push information corresponding to the video number to be a second push level; and if the number of views corresponding to the video number is greater than one but less than the maximum view threshold, determining the push information corresponding to the video number to be a third push level;

wherein the first push level is greater than the second push level and the second push level is greater than the third push level in the push list.

3. A video push device, comprising a memory, a processor, and a video push program stored on the memory and being executable on the processor, wherein when the video push program is executed by the processor, the following steps are implemented:

obtaining keyword information, and filtrating electronic program information according to the keyword information to obtain first push information, wherein the keyword information is tag information pre-stored corresponding to each video in a current network video system and in an electronic program system; or the keyword information is a name of a sub-classified video type of videos;

filtrating network video information according to the keyword information to obtain second push information; and generating a push list according to the first push information and the second push information, and pushing videos according to the push list, wherein the step of filtrating network video information according to the keyword information to obtain second push information comprises:

determining whether there exists match information matching the keyword information in the network video information; and in determination that there exists the match information, filtrating the match information to obtain the second push information, wherein the step of filtrating the match information comprises:

obtaining a match definition of the match information;

detecting bandwidth information of a current network, and determining a preset definition according to the bandwidth information; and filtrating the match information according to the match definition and the preset definition, wherein the step of detecting bandwidth information of a current network, and determining a preset definition according to the bandwidth information comprises:

detecting the bandwidth information of the current network when the match information is obtained;

if the bandwidth information of the current network is at a minimum bandwidth threshold, there is no limitation on the preset definition corresponding to the minimum bandwidth threshold;

if the bandwidth information of the current network is between the minimum bandwidth threshold and a first bandwidth threshold, obtaining a corresponding first definition and taking the first definition as the preset definition, the first bandwidth threshold is greater than the minimum bandwidth threshold; and if the bandwidth information of the current network is greater than a second bandwidth threshold, obtaining a corresponding second definition and taking the second definition as the preset definition, the second bandwidth threshold is greater than the first bandwidth threshold.

4. A video push device, comprising a memory, a processor, and a video push program stored on the memory and being executable on the processor, wherein when the video push program is executed by the processor, the following steps are implemented:

obtaining keyword information, and filtrating electronic program information according to the keyword information to obtain first push information, wherein the keyword information is tag information pre-stored corresponding to each video in a current network video system and in an electronic program system; or the keyword information is a name of a sub-classified video type of videos;

filtrating network video information according to the keyword information to obtain second push information; and generating a push list according to the first push information and the second push information, and pushing videos according to the push list, wherein the step of generating a push list according to the first push information and the second push information comprises:

obtaining video numbers and history information of the first push information and the second push information;

determining video priorities of the first push information and the second push information according to the video numbers and the history information; and generating a push list according to the first push information, the second push information, and the video priorities, wherein the step of determining video priorities of the first push information and the second push information according to the video numbers and the history information comprises:

determining whether the video numbers exist in a history database, thereby determining whether push information corresponding to the video numbers has corresponding history information in the history database;

in determining that a video number doesn't exist in the history database, determining that push information corresponding to the video number has no history information in the history database, and determining the push information corresponding to the video number to be a first push information;

in determining that a video number exists in the history database, obtaining a number of views corresponding to the video number, and if the number of views corresponding to the video number is greater than a maximum view threshold, determining push information corresponding to the video number to be a second push level; and if the number of views corresponding to the video number is greater than one but less than the maximum view threshold, determining the push information corresponding to the video number to be a third push level;

wherein the first push level is greater than the second push level and the second push level is greater than the third push level in the push list.

* * * * *